United States Patent Office 3,832,214
Patented Aug. 27, 1974

---

3,832,214
ELASTOMERIC FILM AND PRODUCT THEREFROM
Wu Lan Wang, Newark, N.J., assignor to
Tenneco Chemicals, Inc.
No Drawing. Original application June 6, 1968, Ser. No. 734,887, now Patent No. 3,634,184. Divided and this application June 28, 1971, Ser. No. 157,716
Int. Cl. B29d 27/04; B44d 1/09
U.S. Cl. 117—47 R    6 Claims

ABSTRACT OF THE DISCLOSURE

Supple, microporous, breathable elastomeric films with a system of intercommunicating cells are described. The films which optionally contain inert organic or inorganic particles varying in size from about 0.02 micron to 150 microns are prepared by deposition from a solution spread on a suitable surface. Deposition is effected by exposure of the solution to a liquid which is miscible with the solvent but which does not dissolve the elastomer. The use of the film in the preparation of leather replacement compositions by integration as a grain layer in and on the surface of suitable substrates is described. For this use the selected substrate is wet with a liquid in which the elastomer is insoluble, coated with a solution of the elastomer in a solvent which is miscible with the liquid used to wet substrate, and the wet, coated substrate is treated with additional liquid to deposit the elastomer extending into the upper strata of the substrate and above its surface.

---

This is a division of Ser. No. 734,887 filed June 6, 1968, now U.S. Pat. 3,634,184.

BACKGROUND OF INVENTION

This invention is concerned with supple, microporous, breathable elastomeric films. It is concerned also with the use of these films for a variety of purposes including the preparation of novel compositions of matter which are useful as replacements for natural leather in a wide variety of applications including shoe uppers. In a particularly preferred aspect of the invention fine, inert particles are dispersed throughout the elastomer.

A need has long existed in the art for a supple, breathable film having the physical properties to withstand hard usage in various applications. For example, the innersoles of shoes should be breathable and have good moisture vapor transmission in order to insure comfort to the wearer. At the same time, the innersole should have good tensile strength, modulus and abrasion resistance to insure long and comfortable wear. Similar problems are encountered in sweatbands for hats, in various outerwear garments such as raincoats and gloves which must be breathable to insure comfort. Films having such properties are also useful in gaskets, filters and analogous applications. The films may be unsupported or supported, for example, by lamination to a woven or non-woven fibrous substrate, or to a resilient foam base.

Such films as have heretofore been prepared have not been completely satisfactory in this regard. They may be breathable, or have suitable moisture vapor transmission properties, but may fail in other respects such as abrasion resistance, flexibility or tensile strength. This invention provides films which avoid these problems. Moreover, the films can be prepared to serve a variety of end uses in which there is appreciable variation in physical requirements. In other words, films can be prepared in accordance with this invention which accent certain properties such as tensile strength and moisture vapor transmission; or, by slight variations in techniques, films can be prepared which accent other properties.

The films can be used alone. They can be laminated to various substrates which may be fibrous or nonfibrous, resilient or rigid, or may have any of a wide variety of physical and chemical properties. They are especially useful in the preparation of leather replacement products by deposition in the upper strata of a leather replacement substrate in such a manner that the film extends above the surface of the substrate.

Recently, a number of synthetic replacements for natural leather have been developed. While suitable in many instances as substitutes for the natural product they have not generally attained the standards required to withstand the physical demands which are imposed by a variety of shoemaking methods.

Often the substitute leather has taken the form of a polymeric coating laminated to fiber substrates. In shoemaking, the lasting of the leather and its subsequent wear in the shoes subjects the leather to a variety of three-dimensional stresses. This often results in structural failures such as delamination in leather replacements products. These failures seriously limit the utility of such products. Often the stresses cause a "show-through" problem in which irregularities of the substrate which are analogous to the variations in density in the corium of natural leather, and responsible for many of its desirable properties, show through the polymeric coating. This show-through has little or no effect on the physical properties of the product, but it does detract from its appearance, often to the point where the product is not commercially suitable. Show-through arises when irregularities in the substrate become apparent through the surface coating or coatings used to protect or to improve the appearance of the substrate. They could, for example, arise as a result of close packing of fiber bundles in some sections of the substrate, and could be on the surface of the substrate or in the body thereof. In either event, when the material is stretched and compressed in the lasting operation, the irregularities show through the top of the layer.

The problem which has been defined as "show-through" in this application is a well-known, art recognized problem which has caused the demise of many materials previously proposed for use as shoe upper products. It is often referred to as "orange peel." It is caused by "print through" of an uneven base layer when the leather substitute is subjected to heavy stretching, for example, in the toe area during lasting.

A number of attempts have been made to solve these problems, but none has been completely satisfactory. Those attempts have generally increased the cost of the product without appreciable improvement in quality.

One approach has been to laminate a scrim layer between the substrate and the coating. This has been helpful, but not completely satisfactory since the scrim occasionally becomes delaminated from the substrate or from the coating. Moreover, the scrim is usually a woven fabric which does not stretch equally in all directions with the result that additional stresses are caused in the structure. Additionally, the scrim causes problems in the roughing step of shoe making and in shoe repair because it is so close to the surface. Very little of the surface coating can be removed before the outline of the scrim layer, or the layer itself becomes apparent.

Another approach has been to apply a relatively thick polymeric coating onto the substrate. This helps with the show-through problem, but it also adds to the cost of the product. It also imparts an undesirable rubber-like characteristic to the product with the result that the product does not have a good "leather-like" feel. The rubber-like characteristic of the polymer layer tends to override and mask the desirable physical properties imparted to the total product by the fiber substrate. The elasticity of the polymeric layer is so different from that of the substrate that deleterious internal stresses are introduced in the product.

In a further attempt to overcome the show-through problem fibers have been dispersed in the polymeric layer. The product has been one in which the fibers have been dispersed so that the majority of them were free of direct contact with each other. This substantial discontinuity of the dispersed fibers is important since the polymeric layer is normally quite thin, and any bunching of the fibers would manifest itself as a defect in the coating. Additionally, if there are too many fibers in contact, the polymeric coating becomes stiff and boardy, and the product loses the aesthetic qualities which are characteristic of natural leather.

This procedure has not been entirely satisfactory. It has been found that if a sufficiently small amount of fiber is dispersed in the polymeric layer to insure substantial discontinuity, the show-through from the substrate is still a problem. On the other hand, if sufficient fiber is dispersed to overcome show-through, the dispersion tends to become continuous with the result that the product may be lumpy and deficient in respect of hand and break. Moreover, the fibers themselves create a secondary show-through problem. The fibers are normally appreciably less resilient than the polymer in which they are dispersed. Therefore, the fiber itself may show through under the stress of shoe making or wearing.

In previous procedures for the preparation of leather replacements, vapor permeable bases, especially those containing randomly distributed fibers entangled and interlocked with each other have been employed as substrates for final products which are normally produced by laminating a polymeric grain layer to the top surface of the substrate. The products thus prepared suffer the deficiencies aforesaid.

Before describing the leather replacement products of this invention in detail it will be convenient to define certain of the terms which will be employed.

*Fiber:* Natural and synthetic materials of suitable denier, length and other dimensions such as polyesters, acrylics, polyamides, modacrylics, vinyls, cellulosics, wool, silk, etc. Inorganic fibers such as glass may be used, but the preferred fibers for the preparation of leather-like compositions are organic fibers. They can be polyamides, such as polyhexamethylene adipamide (nylon 66) or polycaproamide (nylon 6); polyesters, such as polyethylene terephthalate or polydimethylcyclohexyl terephthalate; acrylics such as polyacrylonitrile; vinyls, such as polyvinyl chloride or polyvinyl alcohol; cellulosics such as rayon, etc., and wool. Mixtures of two or more fiber types may be employed.

As used herein, the term "fiber" includes tow, staple, continuous filament and similar fiber forms. The fibers may be present as yarns. They may be crimped (whether or not heat-set) or uncrimped. The fibers employed will generally have a denier between about 0.5 and 6 and preferably between 0.5 and 3. Fiber lengths of at least about ½ inch are desirable. Fibers in conventional textile lengths, e.g. up to three or more inches, are generally suitable for use in this invention.

As used in describing this invention "fiber" refers to a product which is at least 500 times as long as it is wide. This will distinguish fibers from particles which normally do not have any one dimension appreciably greater than another dimension, and are often essentially spherical.

*Fleece:* The structure formed by processing the fibers in the appropriate equipment including, for example, carding, cross laying, air laying, etc. The preferred fleeces for use in the preparation of products of this invention are isotropic fleeces such as may be formed on air-lay equipment. However, a cross-laid fleece in conjunction with other directional structures such as carded fleece, scrim, warp yarn, and the like, can be used. Isotropic continuous filament structures are also suitable.

*Foam:* Relatively low density, porous, cellular, flexible, resilient materials. Polyurethane foam is preferred although rubber latex, vinyl foams and other foams having properties similar to polyurethane foams may also be used.

*Web:* The product formed by combining the fleece and the foam as by needling the fleece into the foam. Reference will also be made to composite webs in which there are at least two fleece components.

*Substrate:* The product formed by depositing an elastomer throughout the web. Composite substrates are formed from composite webs by elastomeric deposition.

The term "substrate" is used herein in two different senses. It is employed in the generic sense to refer to any composition used in association with the grain layer of the invention. It is also used in the more restricted sense of the three component fiber-foam-elastomeric filler defined in the previous paragraph. It is not believed that this will cause any confusion.

*Grain layer:* The term "grain layer" is used in association with products of this invention to describe that portion of the total structure which is analogous to the grain layer of natural leather. The grain layer may be prepared from the same elastomers used to prepare the substrates or composite substrates. Because of the method by which the grain layer is applied, it becomes integrated with the substrate or composite substrate with the result that the final product is not a laminate.

The foregoing rather specialized definitions are especially useful in defining the preferred leather replacement products which can be prepared in accordance with this invention. In such preferred products the film is deposited as a grain layer in the upper strata and above the surface of a fibrous substrate comprising randomly oriented fibers entangled and interlocked with each other. Leather replacement products, suitable for some applications can be prepared by laminating a film of the invention to any of a variety of substrates including woven and non-woven fibrous mats. The films of the invention can also be usefully employed in a large number of products where leather is not normally utilized. They may, for example, be tinted and laminated to an inexpensive fabric backing to produce a product which is suitable for the preparation of wall coverings.

THE INVENTION

In accordance with one aspect of this invention a supple, microporous, breathable elastomeric film is provided. This film is characterized by a system of intercommunicating cells communicating with each other and with both surfaces of the film. There are dispersed within the film from about 30 to about 120 parts by weight of inert particles per 100 parts by weight of dry elastomer in the size range of from about 0.02 micron to 150 microns. The film is preferably a polyurethane elastomer which may contain a major or minor proportion of polyvinyl chloride. Although the films are breathable, they are void-free, that is there are no holes in the elastomer which are visible even at 100× magnification.

The supple, microporous, breathable, elastomeric film of this invention in which the elastomer is preferably polyurethane, or a mixture thereof with polyvinyl chloride, should be carefully distinguished from ordinary filled elastomeric films such as are prepared by dissolving an elastomer in a volatile solvent having a dispersed filler, coating the solution on a surface and evaporating the solvent. These films are neither microporous, nor breathable, nor do they have a system of cells communicating with each other and with the surfaces. Such films are often made breathable by needle punching a plurality of fine holes completely through them, but this is not a system of communicating cells. Moreover, this treatment adversely affects physical properties such as tensile strength and tear strength. It is harmful if the film is to be sewn to a base because the fine needle holes produced to make the product breathable reduce the resistance to propagated tears resulting from the sewing.

The films of this invention should also be distinguished from blown, filled elastomers which are prepared by vaporizing a blowing agent within the body of the elastomer, for example, by heating. These blown elastomers, as is known, are predominantly closed cell in character. Most of the cells are individual units which do not communicate with neighboring cells.

The most useful films within the scope of this invention will range from about 3 to 20 mils in thickness and will contain from about 30 to about 120 parts by weight of inert filler particles per 100 parts by weight of dry elastomer. Films appreciably above or below this thickness range may be useful for some purposes, but generally there is a decrease in the desirable physical attributes of the products as less and less filler is used, or as the thickness of filler, especially with thin films tends to detract from the desirable suppleness of the product, and this is true even with relatively thick films as the amount of filler increases appreciably above 120.

The particle size of the filler may range from about 0.02 micron to 150 microns. Particles appreciably below this size range become more costly with little compensation in physical improvements of the product. Above 150 microns, the particles are generally too coarse, especially with thin films.

The preferred films from the point of view of economy and general range of utility are those which are from 5 to 15 mils thick and contain from 50 to 80 parts by weight of inert particles in which the average size is 20 to 70 microns.

The elastomeric films of this invention are prepared, in the presently preferred procedure, by coating a solution of the elastomer containing the dispersed filler on a release surface, for example, a glass or metallic surface, and then exposing the coating to a liquid which is miscible with the solvent of the solution, but is a non-solvent for the elastomer. This treatment results in a deposition of the elastomer as a microporous film in which the filler is substantially uniformly dispersed. The deposited film is then washed with additional liquid, if desired, and dried. After drying it can be peeled from the deposition surface, and either used directly or stored for future use.

The filled breathable film has excellent physical properties which make it useful for the various purposes aforesaid.

Since the most significant utility presently contemplated for the films of this invention is as the grain layer component of leather replacement products, the invention will, for convenience be described hereinafter as it is applied to the preparation of such products. In leather replacement products the film is deposited in such a way that it extends into the substrate and above its surface and for that reason is referred to as the grain layer so as to releate it to the same component in natural leather.

The leather replacement products which are a particularly preferred aspect of this invention are supple fibrous sheet compositions which manifest the good break, accommodation and lack of pipiness which is characteristic of high quality natural leather. The grain layer when properly applied as described herein has good breathability, water absorption and water vapor transmission. While useful as a substitute for natural leather in a wide variety of applications, they are especially useful in the preparation of shoe uppers.

The particles used to prepare the films and other products of this invention may be organic or inorganic, but should be substantially inert towards the elastomer itself or any of the components utilized in applying the elastomer. The term "inert" means that the particles have little or no chemical effect on the elastomer itself or any of the other components.

Typical of the organic and inorganic particles which may be mentioned by way of example of those which may be employed in the invention are charcoal; aluminum dust and other metallic powders; leather dust; nylon; oxides of silica such as the dioxide; silicate compounds such as sodium aluminum silicate and magnesium aluminum silicate; and oxides of calcium and barium, such as barytes, and talc. These products are available commercially in suitable particle sizes, or may be purchased and ground to suitable sizes. Microporous, microcrystalline, resilient particles are preferred because of their ability to enhance the water absorption and moisture vapor transmission of products prepared utilizing them. Products prepared using them also have a more uniform cell structure in the grain layer. Microcrystalline, microporous, resilient cellulosic particles such as may be prepared by acid hydrolysis of cellulose, followed by mechanical shearing in a water slurry and drying are especially preferred. A typical process for the preparation of these particles is described in Industrial and Engineering Chemistry, vol. 54, No. 9, pages 20–29, September 1962. In order to distinguish these particularly preferred particles from other particles which can be employed in the practice of this invention, they are referred to herein as microporous, microcrystalline, resilient cellulosic particles. They are available commercially under the name Avicel from the Food Machinery Corporation.

Microcrystalline collagens such as those which are prepared from edible, bovine collagan as water insoluble acid salts are suitable. Similarly microcrystalline silicates such as the hydrated magnesium silicate which is obtained from chrysotile asbestos in the form of colloidal, rod shaped, submicron particles may also be employed. These products are available from Food Machinery Corporation under the names Avitene and Avibest, respectively.

In the finished grain layer there may be from about 30 to about 120 parts by weight of particles per 100 parts by weight of dry elastomer. It is most surprising to find that such large amounts of particles can be employed without adversely affecting the product, since only relatively small amounts of fibers can be employed in the polymeric coatings of the prior art.

Generally speaking, leather replacement products of this invention are prepared by spreading a dispersion of the particles in a solution of the elastomer on the selected substrate, which has been previously wet with a suitable liquid. The elastomer is then deposited. The preferred procedure for depositing the elastomer is by coagulation which is effected by exposing the coating to a non-solvent for the elastomer which is at least partially miscible with the solvent of the elastomeric solution. By utilizing this procedure the elastomer is deposited as a stable, microporous product characterized by a system of inter-communicating cells. The elastomer containing particles are deposited within the upper strata of the substrate, below the top surface, and also extend above the surface.

The thickness of the finished grain layer above the substrate will typically be from about 5% to 30% of the total thickness of the grain layer plus the substrate. Normally, this will be from about 5 to 20 mils, and again the thickness may be controlled by the manner of deposition or by the utilization of several layers, some of which may be particle free. In any event, the total thickness of the final product is normally from about 20 to 100 mils.

There are a number of additional features of this invention which permit the production of products with greatly increased physical and aesthetic values compared with previously known leather substitutes. For example, after the first elastomer has been coagulated as described above, the process can be repeated any desired number of times to produce grain layers of varying thicknesses. The physical and chemical characteristics of the selected elastomer used in each instance can be varied so as to produce a product having a gradient density within the grain layer such that the density increases progressively towards the surface.

If desired, the last layer can be sprayed on to the previously coagulated layers and the solvent permitted to evaporate. The result is that a thin deposit of elastomer forms on the underlying layers and helps to seal the surface so as to inhibit liquid penetration.

In one method of practicing this invention the substrate is lightly buffed before coagulating the initial grain layer. This tends to raise a nap on the surface of the substrate, and the raised nap becomes bonded in the elastomer of the grain. This contributes to the strength of the final product. A sufficient amount of elastomer is normally deposited in and on the substrate to submerge all of the raised nap in the grain layer.

In a particularly preferred aspect of this invention, the elastomer solution is spread as a coating on a flexible release surface which may be a specially treated paper or a plastic film such as polyethylene or polypropylene. The substrate, wet with the deposition liquid is then brought into surface contact with the wet elastomer solution layer and the package passed through the nip of combining rolls. The major proportion of the elastomer is thus deposited within the upper strata of the substrate. Additional elastomer may be deposited by the procedures described above, if desired.

While this invention has been described principally as one in which only one surface of a substrate has been treated, it will be appreciated that the invention may also be practiced by treating both surfaces. The product thus produced can be used as prepared, or it may be split longitudinally to form substantially identical products.

The elastomers utilized in the practice of this invention may be selected from a relatively large number of products which are commercially available or can be prepared by known methods. The selected elastomer will be tough, flexible, abrasion resistant, not subject to cold flow, solvent resistant and capable of deposition as a microporous breathable layer with moisture vapor transmission properties similar to those of natural leather. In the microporous film the cells will be very small, generally of an order such that they are not visible even at 100× magnification. They will form an intercommunicating system in which a large proportion of the cells open on one or more of their neighbors. The cells communicate with each other and with both surfaces. This does not preclude the possibility that the deposited elastomer will contain some closed cells.

A convenient test for the initial evaluation of potential elastomers as film or grain layers is to deposit the elastomer from a solution by the addition of an immiscible nonsolvent. If the elastomer deposits as a film, this is an indication that the elastomer is in the correct molecular weight range. The film should dry to a substantially uniformly opaque microporous layer which retains its opacity indefinitely. The development of transparency indicates that the micropores of the film have collapsed demonstrating that the molecular structure is not sufficiently rigid to produce a satisfactory film.

If the dry opaque film appears to be of adequate rigidity, it is next tested for moisture vapor transmission.

Moisture vapor transmission can be tested by placing 10 ml. of water in a flanged cup known as the Payne Permeability Cup. The film is placed over the cup and held in place by clamping it between a circular ring and the flange of the cup. The loaded cup is then placed in a dessicator over anhydrous calcium chloride at substantially constant ambient temperature. The cup is reweighed at the end of 24 hours to determine the weight of water which has permeated through the test film and is thus lost from the cup. This value is recorded as the moisture vapor transmission. The test is a standard test known as the Payne Permeability Test. Elastomers suitable for use in this invention will produce a 10 mil thick particle-free film having a density of from about 20 to 60 pounds per cubic foot and a moisture vapor transmission of from about 100 to 200 mg./cm.$^2$/24 hours.

The same test may be employed to determine the moisture vapor transmission properties of leather replacement products. It should be noted, however, that the values obtained will vary somewhat depending on whether the grain layer or the opposite side of the product faces the water.

The preferred polymers for use in the invention are polyurethanes. These are a well-known class of elastomers obtained by reaction between organic polyisocyanates and an active hydrogen containing material such as polyethers and polyesters with a plurality of hydroxyl groups on the polymer chain. Dihydroxy compounds are preferred. The reaction is carried out by reacting the hydroxyl terminated compound with a molar excess of organic isocyanate to produce an isocyanate terminated prepolymer. The prepolymer chain. Dihydroxy compounds are preferred. The such as water, active hydrogen containing amino compounds, amino alcohols, or diols such as n-butane-diol, ethylene glycol, propylene glycol, and the like.

Suitable chain extenders include water, hydrazine, N-methyl-bis amino propylamine, dimethyl piperazine, 4-methyl-m-phenylene diamine, diaminopiperazine, ethylene diamine. Mixtures of chain extending agents can also be employed.

The prepolymer can be prepared by first mixing a molar excess of the polyisocyanate with the active hydrogen containing polymeric material and heating the mixture at about 50–120° C. Or, the polyisocyanate can be reacted with a molar excess of the active hydrogen containing polymeric material, and the reaction product capped by reacting it with more isocyanate.

Aromatic, aliphatic and cycloaliphatic isocyanates or mixtures thereof can be used in forming the prepolymer. These include, for example, tolylene-2,4-diisocyanate;
tolylene-2,6-diisocyanate;
m-phenylene diisocyanate;
biphenylene 4,4'-diisocyanate;
methylene bis-(4-phenyl isocyanate);
4-chloro-1,3-phenylene diisocyanate;
naphthalene-1,5-diisocyanate;
tetramethylene-1,4-diisocyanate;
hexamethylene-1,6-diisocyanate;
decamethylene-1,10-diisocyanate;
cyclohexylene-1,4-diisocyanate;
methylene bis(4-cyclohexyl isocyanate) and
tetrahydronaphthalene diisocyanate.

Arylene diisocyanates, that is isocyanates in which the isocyanate groups are attached to an aromatic ring, are preferred. In general, they react more readily than to alkylene diisocyanates.

Polyalkylene ether and ester glycols are preferred active hydrogen containing polymeric materials for the prepolymer formation for reasons of availability and economy. The most useful polyether glycols have a molecular weight of 300 to 5000, preferably 400 to 2000, and include for example, polyethyleneether glycol, polypropylene ether glycol, polytetramethyleneether glycol, polyhexamethyleneether glycol, polyoctamethyleneether glycol, polynonamethyleneether glycol, polydecamethyleneether glycol, polydodecamethyleneether glycol, and mixtures thereof. Polyglycols containing several different radicals in the molecular chain such as, for example, the compound

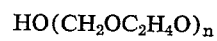

wherein $n$ is an integer greater than 1 can also be used.

Polyester glycols which can be used in conjunction with the polyalkylene ether glycols may be produced by reacting acids, esters or acid halides with glycols. Suitable glycols are polymethylene glycols, such as ethylene-, propylene-, tetramethylene-, decamethylene glycols, substituted polymethylene glycols such as 2,2-dimethyl-1,3-propanediol, cyclic glycols such as cyclohexanediol and aromatic glycols such as xylylene glycol. Aliphatic glycols are generally preferred when maximum product flexibility is desired. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C., and molecular weights like those indicated for the polyalkyleneether glycols. Acids suitable for preparing such polyesters are, for example, succinic, adipic, suberic, sebacic, terephthalic and hexahydroterephthalic acids and the alkyl and halogen substituted derivatives of these acids.

The chain extension reaction may be carried out at a temperature up to about 80° C., but is usually effected at about room temperature, i.e. 25° C. to 35° C. During the reaction, prepolymer molecules are joined together into a substantially linear polyurethane polymer, the molecular weight of which is usually at least 5000 and sometimes as high as 300,000. The reaction can be carried out without a solvent in heavy duty mixing equipment or it can be carried out in a homogeneous solution.

Since the resulting polyurethane polymer has rubber-like elasticity, it is referred to as an "elastomer", although the degree of elasticity and rubber-like resilience may vary widely from product to product depending on the chemical structure of the polymer and the materials in combination with it.

Polyvinyl chloride may be used in conjunction with the polyurethane described above. When making a flexible shoe upper material or the like from a blend of polyurethane elastomer and polyvinyl chloride polymer, it is often preferred to employ a major proportion (over 50 weight percent) of the former and a minor proportion (less than 50 weight percent) of the latter. However, useful films are also obtainable in accordance with this invention when the elastomer blend contains a major proportion (at least 51% by weight) of polyvinyl chloride.

Various additives such as stabilizers, coloring agents, plasticizers, and the like, can be added to the elastomer solution to enhance the properties or appearance of the final product.

The preferred solvent for the preparation of the elastomer solution is dimethyl formamide because of its high solvent power and because it is miscible with water, which is the preferred depositing or coagulating liquid. However, other solvents and solvent blends can also be employed. Dimethyl formamide and methyl ethyl ketone in various proportions form useful solvents for use in association with water. The criteria for selecting the solvent or solvent blend are that they should dissolve the elastomer and be at least partially miscible with another liquid which does not dissolve the elastomer.

The preferred non-solvent liquid is water because it is the least expensive. Other non-solvent liquids, including aqueous blends such as water and alcohol, may be employed. It is preferred therefore that the elastomer solvent be miscible with water or aqueous blends.

A feature of this invention is the discovery of methods for deposition of the elastomer in a manner such that a microporous film is formed in and on the substrate in which the micropores communicate with each other and with the surface. In all of these newly discovered procedures the substrate is first wet with a liquid which is a non-solvent for the elastomer and miscible with the solvent of the elastomeric solution. Excess liquid is then removed, as by squeezing. Sufficient liquid should be removed so that the substrate, although wet, is substantially free of any surface film of liquid. This aids in permitting the elastomer to penetrate into the upper strata of the substrate. The elastomeric solution is then applied to the surface of the wet substrate by any suitable technique such as curtain coating, spraying, roller-coating, knife coating, and the like. The elastomer is then deposited by exposing the solution to a miscible non-solvent in either the liquid or vapor form. For example, the coated substrate can be dipped into a water bath and held in the bath until substantially all of the elastomer has deposited, or the coated substrate may be exposed to a humid atmosphere to deposit the elastomer. In either event, the product is then washed and dried. It may be advantageous in certain instances to add sufficient water or other miscible liquid to the elastomeric solution to bring the elastomer to the point of incipient precipitation before coating the substrate and finally depositing the solid elastomer. It is a particular advantage of the microporous, microcrystalline, cellulosic particles which are preferred for use in this invention that elastomers can be deposited as void-free films from solution-dispersions containing them without the use of incipient precipitation methods. The uniformity of the grain layer may often be improved by wetting the substrate with a liquid mixture containing up to about 40% of the same solvent used in the elastomeric solution together with the miscible non-solvent. It is understood, of course, that other liquids or liquid blends as well as vapors of the liquids or blends may be used in the same manner as the water.

For thin films of deposited elastomer the preferred procedure is to spray a light film of the elastomer solution containing the dispersed particles onto the wet substrate, and to deposit the elastomer by exposing the treated product to a humid atmosphere or to a liquid non-solvent. For heavy films it is preferred to cast a heavy covering of the solution-dispersion on the surface of the wet substrate prior to deposition of the elastomer. The spray technique may be used if the thickness of dry elastomer above the surface of the substrate is to be less than 10 mils. Casting is preferred if the thickness is more than 10 mils. An especially preferred combining technique which may be used with either thin or thick layers is described above.

The presently preferred process for attaining the advantages of this invention will now be described in more detail. The process is designed to produce a grain layer which is integral with the upper strata of the substrate. Broadly speaking, the process comprises the steps of:

(1) Wet the substrate with a liquid which is miscible with the solvent used to dissolve the selected elastomer or mixture of elastomers, but in which the elastomer is not appreciably soluble. Wetting can be accomplished by soaking the substrate in the selected liquid and squeezing to remove the excess. Care should be taken to be certain that at least the upper strata of the substrate is saturated with the liquid, but that there is substantially no surface film of liquid. A surface film of liquid inhibits penetration of the elastomer causing it to deposit as a surface coat which is not integral with the substrate.

(2) Coat the surface of the wetted substrate with a solution of the elastomer or elastomer mixture. For thin coats of deposited elastomer the preferred procedure is to spray a light film of the solution onto the substrate, and to coagulate by exposing the treated product to a humid atmosphere or to wash with water. For heavy films it is preferred to cast a heavy covering of the elastomer solution on the surface of the substrate prior to water washing or exposure to a humid atmosphere. The spray technique will normally be used if the thickness of the dry elastomer above the surface of the substrate is to be less than 10 mils. Casting is preferred if the thickness is more than 10 mils. Not all of the elastomer solutions need to contain the particulate filler. In fact, useful products can be obtained, as is illustrated in the examples, if no filler at all is employed. The term "coat" as used herein also includes the especially preferred process described above in which the elastomer is deposited from a release surface.

(3) Expose the coated, wetted substrate to the miscible liquid. This may be accomplished as suggested above, by again dipping the product in the miscible liquid or by exposing it to vapors of the liquid. This causes the elastomer to deposit as a microporous layer with a system of cells communicating with each other and with the surface. The exact procedure and conditions employed in this step depend upon whether or not additional elastomer is to be deposited. If only one layer of elastomer is to be utilized as the grain layer, it is best to wash out substantially all of the solvent. If several layers are to be used, it is best to leave some of the solvent in the substrate, since this permits subsequent elastomeric solutions to penetrate the lower layers. The elastomer from the second and subsequent layers thereby becomes integral at least with the layer immediately below it. Of course, if several layers are employed, substantially all of the solvent is washed out of the last layer.

(4) If the first or any subsequent layer is to be coated with an additional layer the product is again squeezed so that there is no surface film of miscible liquid or of miscible liquid mixed with solvent. The process is then repeated.

The product may then be dried, either by standing at ambient temperature, or in a heated atmosphere, or by forced, hot gas.

It is preferred in the practice of this invention to deposit a plurality of microporous layers of elastomer. This helps mask show-through, and produces a product which is more satisfactory in respect of break, accommodation, hand, appearance, feel and other aesthetic properties of leather and are products with only one relatively thick grain layer.

Additionally, the use of several thin elastomeric layers allows for the production of a final product in which there is a gradient density within the grain layer. It has been found that the lower the rate at which the elastomer is permitted to deposit or coagulate, the more dense will be the microporous deposit. Under the same conditions of exposure to the coagulating liquid, higher molecular weight elastomers will deposit more rapidly than will the lower molecular weight products. By utilizing these findings the density of the grain layer can be varied as it is formed.

The solutions of elastomers containing dispersed particles which are described herein are useful for the production of grain layers on a number of substrates which are employed in the preparation of leather substitutes and for other purposes. These solutions contain dissolved elastomer together with from about 30 to 120 parts by weight of particles based on the dry elastomer content. The concentration of elastomer in solution may vary within a wide range and will be selected at least partly on the basis of the method selected for coating the substrate. Thus, solutions which can be knife coated or roller coated onto the substrate might be too viscous for use with spraying techniques. Solutions which are too dilute may be wasteful of solvent even if solvent recovery techniques are employed. Moreover, they will require extra large equipment. Optimum concentrations will also depend upon the elastomer or elastomer mixture chosen. The concentration of the elastomer in solution is generally sufficient if held within the range from about 2% to 15% for spraying. For casting it is preferred to utilize solutions in which the elastomer concentration is about 15% to 45%. Excellent results in respect of economy, masking of show-through, break, hand, lack of pipiness and other leather like characteristics are obtained with such solutions when they contain from 50 to 80 parts by weight of inert particles for each 100 parts by weight of elastomer.

A suitable substrate for use with the grain layers of this invention is described and claimed in copending application Ser. No. 562,532, filed July 5, 1966, now abandoned, the teachings of which are incorporated herein by reference.

This application describes and claims breathable, supple fibrous sheet compositions comprising an interlocking network of fibers and a cellular material such as polyurethane foam in which there are void spaces between the fibers and the foam. These void spaces are substantially filled with a soft, resilient filler material which may be the same elastomer which is utilized in this invention but is not necessarily so.

The substrate may be prepared by placing a fleece of fibers on a sheet of polyurethane foam and forcing the fibers into the foam, preferably by needling. The resulting web is then compressed at elevated temperatures and pressure and impregnated with an elastomeric solution such as is described above. The elastomer is then deposited in the web using substantially the same procedures as are used to deposit the elastomer of this invention. The product thus formed is again compressed to form a substrate which may be utilized as a base for the grain layer of this invention.

The flexible, cellular polyurethane foam used in the preparation of the above described substrate is a well known class of polymers the most familiar members of which are prepared by reacting polyhydroxy terminated polyethers or polyesters with organic polyisocyanates such as 2,4- and 2,6-tolylene diisocyanates in the presence of a gas producing agent such as water or liquid halogenated hydrocarbons, particularly fluorohydrocarbons such as those available under the trademark Freon.

Polyurethane foams which can be employed are those requiring a compression of about 3 to 100 pounds per 50 square inches to produce a 25% deflection on a two inch sample at 25° C., in accordance with ASTM test number 1564–59T for indent load deflection. Preferably they will have a tensile strength of about 5 to 35 pounds per square inch, an ultimate elongation between about 100 and 400%, and a tear strength of about 0.6 to 5 pounds per inch. The preferred foams are open cell with about 25 to 100 cells per linear inch and a density of about 0.8 to 6 pounds per cubic foot.

The fiber foam combination, or web, is preferably prepared by needling the fibers of the fleece into the foam sheet, which may be from about 0.020 to 1.5 inches thick. The fibers are needled into the foam at a penetration density of from about 250 to 1500 penetrations per square inch. The web may then be turned over and needled from the other side at a penetration density of about 200 to 1500 penetrations per square inch. A third needling from the fleece side at roughly the same penetration density may be employed.

The degree of penetration of the needling will vary with the thickness of the sheet. Sufficient penetration will be achieved if at least 50% of the penetrating fibers penetrate at least about 75% of the sheet thickness and at least some of the fibers completely penetrate the sheet. It is preferred that at least 10% of the fibers completely penetrate the sheet. Conventional needling devices, preferably fitted with relatively fine needles have a number of barbs which snag the fibers and force them through the foam.

The fleece may be made of any of the common natural or synthetic fibers or fiber blends defined above, desirably with fiber lengths of at least one half inch. Non-woven fleeces of comparatively loose construction are favored. These include, for example, loosely knit yarn structures, webs produced by carding, air-laying, and the like. The fleece may have a weight between 2 and 24 ounces per square yard. The presently preferred fleeces are air-laid non-woven fleeces having a weight of from about 3 to 10 ounces per square yard. Two or more superimposed fleeces may be used.

The web produced by needling the fleece into the foam is next compressed at elevated temperature and pressure. The selected temperatures and pressures are such that neither the fiber or the polyurethane flows, so that fiber is not deformed and the cellular structure of the polyurethane foam is not lost. The temperature is usually from 230° F. to 375° F., and in flat bed presses the pressure is from about 100 to 400 pounds per square inch. The compression time in flat presses is from about 30 seconds to 15 minutes. Where other equipment is used, the time of compression will be varied to produce equivalent compression conditions. For example, equivalent compression times for a rotary press are generally found to be somewhat lower than with a flat-bed press.

The web obtained after compression is a supple, integrated fiber foam combination which contains a large number of void spaces in which the fibers are held apart by the foam. The composition of the web depends, of course, on the thickness, density and other characteristics of the fleece and the foam. Typically the web may comprise 10% to 80% by weight fibers and 20% to 90% foam, based on the total weight. It may vary from about 20 to 100 mils in thickness, and from about 15 to 100 pounds per cubic foot in density. Webs appreciably above and below these ranges may also be produced and usefully employed in the practice of this invention.

The void spaces in the web are next substantially, although not completely, filled by depositing an elastomer which may be of the same class, and may be selected using the same techniques as the elastomers described above. Deposition may be effected using the same procedures as described above. The preferred procedure is to impregnate the web with a solution of the elastomer and to soak the wet, impregnated web in water or another aqueous medium. An alternate procedure for depositing the elastomer is to evaporate the solvent. The evaporating or baking temperature employed should be high enough to evaporate the solvent, but not high enough to cause the elastomer to flow. The amount of solution originally impregnated into the web is such that the dry elastomer added is from about 25% to 75% by weight, based on the total weight of the substrate. The fiber content of the substrate may vary from about 5% to 55% by weight, and the foam content from about 10% to 60% by weight; all percentages being based on the total weight of the composition.

The water wash technique for depositing the elastomer produces a product which is somewhat more breathable than that produced by evaporating the solvent. The fact that the product is breathable no matter which technique is employed clearly establishes that the void spaces which were present in the web are not completely filled in the substrate. Substrates produced by the water-wash technique generally have better aesthetic properties, such as hand, break, accommodation, etc., and this procedure is preferred when these qualities are important in the end use of the product.

In the last step, the substrate is again compressed under conditions such that the surface is smoothed and the substrate is permanently set. As used herein the term "permanently set" means that the substrate will not return to its original volume when the heat and pressure are removed, but will substantially retain the volume which it assumed when subjected to these influences.

The processing conditions which are applied in the same manner as described above in connection with the initial compression step are: time, about 5 seconds to 3 minutes; temperature, about 65° F. to 250° F.; pressure, about 50 to 300 pounds per square inch.

The product thus produced is similar in structure to natural leather, which has an interlocking system of fiber or fiber bundles running through its entire thickness. The fibers are held apart by a relatively soft, resilient fatty substance which does not prevent their restricted movement within the body of the structure. As in natural leather the fibers retain their flexibility, and because they are able to move in the soft filler material they are able to adjust themselves to react to the stresses which are applied, for example, in the lasting of the leather or the wearing of the shoe so as to disperse the stress over several fibers.

When this substrate is coated in accordance with this invention using the procedure described above the resulting product is a breathable, supple, fibrous sheet composition comprising an interlocking network of fibers and foam having void spaces therebetween in which the fibers are capable of restricted movement, the network having dispersed therein a soft, resilient filler which substantially, but completely fills the void spaces; the said composition being integral with a microporous elastomeric film having from about 30 to 120 parts by weight of particles per 100 parts by weight of elastomer dispersed therein. At least part of the film is deposited within the upper strata of the composition while a part of it extends above the surface thereof.

The web described above may also be used in association with the grain layer of this invention. The web is more fully described in commonly assigned, copending patent application Ser. No. 487,301, filed Sept. 14, 1965, now U.S. Pat. 3,477,898, the teachings of which are incorporated herein by reference.

The preferred substrate for use with the grain layers of this invention are those described in commonly assigned, copending patent application Ser. No. 719,219, filed Apr. 5, 1968, now abandoned, the teachings of which are incorporated herein by reference.

This application describes and claims a substrate which is an improvement over the substrate described and claimed in the above identified application, Ser. No. 562,532. The most important improvement is that a composite substrate is produced having a gradient density such that the flesh side is less dense than the grain side with the result that the flesh side is relatively more compressible than the grain side. This is an important development. The product very closely reproduces the gradient density found in natural leather. As a consequence it is more capable of withstanding the rigors of shoemaking, especially the tendency towards surface distortions in areas of exceptional stress such as in the toe and heel areas of the shoe.

The substrates are produced from composite webs in which webs such as those described above serve as base webs. A fleece of fibers is mechanically bonded, as by needling, to the base web. The fibers in the second fleece are no coarser than, and preferably less coarse than the fibers in the base web. The composite web thus produced is compressed, and the elastomer is deposited in the void spaces of the base web and the interstices of the superimposed fleece using the same techniques described above. The elastomer is selected using the same criteria previously outlined. The product thus produced may be further heat treated under pressure although it is not essential to do so.

The foams, fibers, elastomers, solvents and non-solvents utilized in the preparation of these composite substrates may be the same as are used in the preparation of the substrates of Ser. No. 562,532. The procedures for needling and depositing the elastomer are also similar. The compression steps, however, are less rigorous. They are, in the first compression, from about 250° F. to 375° F. at a pressure of from about 5 to 100 pounds per square inch for a period of from about 20 seconds to 5 minutes. The conditions of the heat treatment are the same as in the compression step unless a plurality of fibers is employed in the top fleece at least one of which is thermoplastic. In that event, the heat treatment may be effected at a temperature of from about 300° F. to 350° F., at a pressure of from about 2 to 5 pounds per square inch for from about 10 to 30 seconds.

In the preferred embodiment of the invention, the top fleece of the composite substrate is prepared from a plurality of fibers at least one of which is thermoplastic under the conditions at which the initial compression step is carried out. It is most convenient to use a fiber pair. The thermoplastic fiber flows slightly with the result that it becomes bonded to the other fibers at spaced apart points. This has the effect of increasing the dimensional stability and modulus of the composite substrate without adversely affecting its other properties. If a thermoplastic fiber is used, the amount will normally vary from about 15% to 50%, based on the total weight of fiber in the top fleece.

The product produced by the process described is a supple, fibrous sheet composition characterized by a gradient density such that the density decreases from the top to the bottom comprising:

(a) a base web which is an interlocking network of randomly oriented and distributed fibers in a polyurethane foam with void spaces therebetween, (b) a top fleece mechanically bonded to the surface of said base web and comprising additional fibers, the denier of which is no greater than the denier of said randomly oriented fibers, said additional fibers having fine interstices therebetween, and being predominantly in a horizontal plane, and (c) a soft, resilient, elastomeric filler which substantially, but not completely fills said void spaces and said interstices.

In the composite substrate the dry elastomer content varies from about 25% to 75%, the fiber content from about 5% to 55%, and the foam content from about 10% to 25%, all based on the total weight. The weight of the top fleece varies from about 10% to 25%, based on the total weight of the composite substrate.

Other suitable substrates are known and can be formed with the grain layers of this invention to produce products which are suitable as leather replacements for a variety of end uses. These are described, for example, in U.S. Pats. Nos. 2,910,763; 2,978,785; 2,723,935; 3,067,483; 3,238,055 and 3,000,757.

The following examples are given by way of illustration only and should not be considered as limitations of this invention, many apparent variations of which are possible without departing from the spirit or scope thereof. The examples specifically illustrate many of the fibers, foams, particles and elastomers which can be used in the practice of this invention. Other components of products within the scope of the invention can be readily selected by following the teachings of the foregoing disclosure.

Example 1

Fibers of 100% 1.5 denier by 1.5 inch nylon 66 are air-laid on a webbing machine to produce a fleece of 3 oz./sq. yard. This fleece is integrated with a 0.025 inch thick sheet of polyester polyurethane foam having a density of approximately 1.5 lb./cubic foot, as follows:

(a) 600 penetrations per square inch from the fiber side (300 penetrations as $11/16$ inch depth, 300 penetrations at $9/16$ inch depth).

(b) 600 penetrations per square inch from the foam side (300 penetrations at ½ inch, 300 penetrations at $7/16$ inch depth).

The web with the fiber side up is then brought into contact with a newly laid fleece of a 2:1 blend of 1.5 denier by 1.5 inch nylon 66 and 1.5 denier by 1.5 inch polyester fiber. It is again cast through a needle loom with the fiber side up to produce a composite web. The penetration density is 600 penetrations per inch at $9/32$ inch depth.

The resulting composite web is compressed in a rotary press during a dwell time of one minute at a belt pressure of 5 lbs./sq. inch while applying heat to the fiber side at 315° F. to cause the ester fiber to bond to the nylon fiber at spaced apart points.

The composite web is then impregnated with a polyester polyurethane elastomer solution in dimethyl formamide having a 20% solids concentration, and passed through metering rolls so that the total wet add on is 500%. The elastomer is the rection product of diethylene glycol, adipic acid and toluene diisocyanate (Helastic 1360). The impregnated web is next passed into a water bath so as to deposit the elastomer in the composite web. The water bath is equipped with rollers to move the product along. The product is washed with water by passing it through a second water bath similarly equipped with rollers and finally dried.

The dried substrate thus produced is immersed in an aqueous bath. The wetted product is squeezed through rollers to produce a wet substrate having no surface film of liquid. A solution containing 10% by weight of a polyester polyurethane elastomer in dimethyl formamide is then spray-coated onto the surface to produce a film approximately 2 mils thick. The coated substrate is then passed through an aqueous bath to deposit the elastomer as a microporous surface coating which extends into the upper strata of the substrate. The product is washed with water, dried and spray-coated with an acrylic decorative finish.

The resulting product is useful as a replacement for natural leather.

By alternately wetting the substrate with the same liquid mixture, squeezing to produce a surface film-free product, spray-coating and depositing the elastomer as described above, the degree to which the microporous grain layer extends above the surface is increased. The products produced are not laminar. The elastomer from each successive treatment becomes integrated with the elastomer of the previous treatment so that in the final product the grain layer extends into the upper strata of the substrate and above its surface.

The elastomer solution utilized in the preparation of the grain layer is prepared by reacting 74 parts by weight of polyethylene glycol adipate having a molecular weight of about 2000, terminal hydroxyl groups and an hydroxyl content of 1.5% at 100–110° C. for one hour with 19.75 parts by weight of p,p′-methylenediphenyl diisocyanate in dry dimethylformamide and chain extending by reaction at 35° C. for one hour with 7.1 parts by weight of methylene dianiline as a 30% solution in dimethyl formamide. The solution which contains 25% by weight of the elastomer is diluted with additional solvent to produce a solution having a 10% solids content. The elastomer deposits a stable film when tested in accordance with the procedure described above.

Example 2

The procedure of Example 1 is repeated except that the top fleece contains only nylon and does not contain a thermoplastic fiber. In this example the composite substrate produced by deposition of the polyurethane elastomer within the composite web is subjected to a heat treatment at 300° F. at a pressure of 80 lbs./sq. inch for three minutes before the grain layer is applied.

The product thus produced is useful as a replacement for natural leather.

Example 3

Fibers of 100% 1.5 denier by 1.5 inch nylon 66k are air-laid to produce a fleece of 8.5 oz./sq. yard. This fleece is integrated as described in Example 1 into a 0.025 inch thick sheet of a polyester polyurethane foam having a density of 1.5 lbs./cubic foot. The resulting web is compressed in a flat press during a dwell time of 3 minutes, at a pressure of 300 lbs./sq. inch and a temperature of 300° F. The compressed web is then impregnated with a solution of the same polyester polyurethane elastomer used in Example 1 in dimethyl formamide with a solids content of 35%. The elastomer is deposited in the web using the same procedure as in Example 1. The product is washed, dried and heat-treated in a flat press at 275° F. and 75 lbs./sq. inch pressure for 3 minutes.

The dried substrate is immersed in a water bath and squeezed to remove sufficient water so that there is no surface film. It is coated with a solution containing 30% by weight of the same polyester polyurethane elastomer employed in Example 1 in dimethyl formamide. The depth of the wet film thus produced is approximately 40 mils. The product is passed into a water to deposit the elastomer as a grain layer. It is then washed with water and dried.

The procedure is repeated except that no elastomeric filler as deposited in the fiber-foam web and the heat treatment is omitted.

The products produced are useful as replacements for natural leather.

Similar products are produced by repeating the procedures of this example except that the elastomer is deposited as a grain layer by exposing the elastomer-coated substrate to a humid atmosphere in which the relative humidity is about 90% at room temperature.

Example 4

The suitability of a number of fillers for use in the products of this invention is established by casting elastomeric films of the polyester polyurethane elastomer of Example 1 on a smooth glass surface.

The selected particulate samples of the fillers are taken up in an elastomeric solution in dimethyl formamide containing about 25% elastomer by weight and the viscosity adjusted by the addition of dimethyl formamide to produce a solution-dispersion which would not flow off the glass surface before formation of the elastomeric film. The total dry solids content of the solution-dispersions varies from about 25 to 30%.

The films are prepared by coating a smooth glass surface with a layer of the solution-dispersion which is about 35 mils in thickness. The glass is then immersed in a bath containing 70 parts dimethyl formamide and 30 parts water to deposit the elastomeric film. The deposited film is finally washed in water and dried. The films are opaque and retain their opacity indefinitely. The films are then peeled from the glass and their properties tested by standard procedures. The results are listed in Table I.

These particle filled films are useful alone as sweatbands for hats. They were laminated to a sheet of urethane foam using a copolymer of 2-ethyl hexyl acrylate and vinyl acetate and die cut to form inner soles for shoes. They were laminated to a cotton backing and the resulting product formed into gloves which were especially suitable as work gloves because of their abrasion resistance and breatheability.

The web with the fiber side up is then brought into contact with a newly laid fleece of a 2:1 blend of 1.5 denier by 1.5 inch nylon 66 and 1.5 denier by 1.5 inch polyester fiber. It is again cast through a needle loom with the fiber side up to produce a composite web. The penetration density is 600 penetrations per inch at 9/32 inch depth.

The resulting composite web is compressed in a rotary press during a dwell time of one minute at a belt pressure of 5 lbs./sq. inch while applying heat to the fiber side at 315° F. to cause the ester fiber to bond the nylon fiber at spaced apart points.

The composite web is then impregnated with a polyester polyurethane elastomer solution in dimethyl formamide having a 20% solids concentration, and passed through metering rolls so that the total wet add on is 500%. The elastomer is the reaction product of diethylene glycol, adipic acid and toluene diisocyanate (Helastic 1360). The impregnated web is next passed into a water bath so as to deposit the elastomer in the composite web. The water bath is equipped with rollers to move the product along. The product is washed with water by passing it through a second water bath similarly equipped with rollers and finally dried.

The dried substrate thus produced is immersed in a mixture of 70 parts dimethyl formamide and 30 parts water. The wetted product is squeezed through rollers to produce a substrate with about 60% liquid add on, but no surface film of liquid. The microporous, microcrystalline, resilient, cellulosic, particle-containing elastomeric solution described in Example 4 is then coated onto the surface to produce a wet film approximately 2 mils thick. The coated substrate is then passed through an aqueous bath containing 70 parts dimethyl formamide and 30 parts water to deposit the elastomer as a mircorporous surface coating containing the particles and extending into the upper strata of the substrate.

The process is repeated using the other particle-containing elastomer solution-dispersions described in Example 4 and also using equivalent compositions in which talc and other inorganic particles of a particle size of approximately 100 microns are employed. Additional products

| Filler | Quantity [1] | Thickness, mils | MEDS,[2] p.s.i. | Elongation, at MEDS, percent | Modulus in p.s.i. at— | | Ultimate T.S. in p.s.i. | Ultimate elongation, percent | Density, lb./ft.[3] | MVP [3] |
|---|---|---|---|---|---|---|---|---|---|---|
| | | | | | 25 | 100 | | | | |
| No filler | 0 | 9.5 | 95 | 35 | 70 | 210 | 743 | 465 | 29.8 | 159.00 |
| Avicel [4] | 71.4 | 11 | 198 | 11 | 320 | 415 | 807 | 378 | 52.0 | 104.00 |
| Leather dust | 42.8 | 10 | 225 | 10 | 450 | 950 | 1,210 | 180 | 48.8 | 51.26 |
| Molecular sieve [5] | 71.4 | 10 | 95 | 35 | 69 | 168 | 425 | 293 | 50.8 | 159.82 |
| Cab-O-Sil [6] | 38.0 | 9 | 165 | 10 | 207 | 332 | 555 | 215 | 52.4 | 194.80 |

[1] Amount of filler per 100 parts of elastomer.
[2] Maximum Elastic Deformation in pounds per square inch.
[3] Moisture Vapor Transmission in mg. cm.²/24 hours.
[4] Microporous, microcrystalline, resilient cellulosic particles—particle size 1-100 microns, average 38 microns.
[5] Hydrated crystalline sodium aluminum silicate—particle size 0.0-0.05 micron.
[6] Colloidal silica—particle size 0.012 microns.

These results establish that the elastomer solutions and the solution-dispersions are well suited for the preparation of the products of this invention. It will be noted that by selection of the particular filler the physical properties of the film can be varied within wide limits. In similar experiments it was shown to be possible to control the physical properties of the filled film by varying the amounts of filler from 30 to 120 parts by weight per 100 parts of dry elastomer.

Example 5

Fibers of 100%, 1.5 denier by 1.5 inch nylon are airlaid on a webbing machine to produce a fleece of 3 oz./sq. yard. This fleece is integrated with a 0.025 inch thick sheet of polyester polyurethane foam having a density of approximately 1.5 lb./cubic foot, as follows:

(a) 600 penetrations per square inch from the fiber side (300 penetrations at 11/16 inch depth, 300 penetrations at 9/16 inch depth),
(b) 600 penetrations per square inch from the foam side (300 penetrations at ½ inch, 300 penetrations at 7/16 inch depth).

are prepared using microcrystalline bovine collegen particles or microcrystalline hydrated magnesium silicate particles of a particle size of about 200 Angstroms.

The products produced by these processes are useful as replacements for natural leather.

Example 6

The products produced by the procedures of Example 5 are treated to increase the degree by which the grain layer extends above the surface of the substrate. This is accomplished by first wetting the substrate with the same 70:30 dimethyl formamide-water mixture used in Example 5. The wetted substrate is then squeezed to produce a wetted product which dies not have a surface film of liquid and the thus treated product is spray-coated with a solution containing 10% by weight of the same polyester polyurethane elastomer used in Example 5 in dimethyl formamide. The spray-coated product is then passed through a water bath to deposit the elastomer. The products produced are not laminar. The elastomer from each successive treatment becomes integrated with the elastomer of the previous treatment so that in the final product the grain layer extends into the upper strata of the substrate and above its surface.

The products thus produced are useful as replacements for natural leather.

Example 7

The procedures of Example 5 are repeated except that the top fleece in the composite web contains only nylon and no thermoplastic component. Additionally, the composite substrate produced by deposition of the polyurethane elastomer within the composite web is subjected to a heat treatment at 300° F. at a pressure of 80 lbs./sq. inch for 3 minutes before the particle-containing grain layers are applied.

The products thus produced are useful as replacements for natural leather.

Example 8

Fibers of 100% 1.5 denier by 1.5 inch nylon 66 are airlaid to produce a fleece of 8.5 oz./sq. yard. This fleece is integrated as described in Example 5 into a 0.025 inch thick sheet of polyether polyurethane foam having a density of 1.5 lb./cubic foot. The resulting web is compressed in a flat press during a dwell time of 3 minutes at a pressure of 300 lbs./sq. inch and a temperature of 300° F. The compressed web is then impregnated with a solution of the same polyester polyurethane elastomer described in Example 4 in dimethyl formamide with a solids content of 35%. The elastomer is deposited in the web using the same procedures as in Example 2. The product is washed, dried and heat-treated in a flat press at 275° F. and 75 lbs./sq. inch pressure for 3 minutes. The dried substrate is immersed in a water bath and squeezed to remove sufficient water so that there is no surface film. It is coated with a solution containing 25% by weight of the same polyester polyurethane elastomer described in the preparation of the film reported in Table I and containing approximately 70 parts of the molecular sieves used in Example 4, per 100 parts of resin. The product is passed into a water bath to deposit the particle-containing elastomer as a grain layer. It is then washed with water and dried.

The procedure is repeated except that no elastomeric filler is deposited in the fiber-foam web and the heat treatment is omitted.

Similar products are produced by repeating the procedure of this example except that the elastomer is deposited as a grain layer containing molecular sieve particles by exposing the elastomer coated substrate to a humid atmosphere in which the relative humidity is about 90% at room temperature.

The products thus produced are useful as replacements for natural leather.

Example 9

A polyurethane elastomer is prepared from polytetramethylene golycol, toluene-2,4-diisocyanate chain extended with ethylene diamine. A 20% solution of this elastomer forms a stable microporous film having a moisture vapor transmission of about 75 mg./cm.$^2$/24 hours. The procedure of Example 5 is repeated, except that the grain layer is formed from the elastomeric solution of this example. The resulting product is useful as a leather replacement.

What is claimed is:

1. A process for the preparation of a breathable, supple fibrous sheet composition comprising a vapor permeable substrate having a grained layer thereon penetrating into the upper strata thereof, said grain layer comprising a microporous elastomer film containing water-insoluble, inert particles and having intercommunicating cells which comprises the steps of:
   (a) wetting a substrate containing randomly oriented fibers entangled and interlocked with each other with an aqueous liquid in which said elastomer is insoluble to produce a wet substrate in which the surface is substantially free of a surface film of said aqueous liquid,
   (b) coating the wetted substrate with a solution containing from about 2% to 45% by weight of said elastomer, based on the weight of the solution, in a solvent which is miscible with the aqueous liquid, together with from about 30 to 120 parts of said inert particles per 100 parts by weight of dry elastomer in the size range of from 0.02 micron to 150 microns,
   (c) exposing the coated, wetted substrate to additional aqueous liquid to deposit said elastomer film as a grain layer extending above the surface of said substrate and into the upper strata thereof, and
   (d) drying resulting product.

2. A process as in claim 1 wherein the elastomer is selected from the group consisting of polyurethane, polyvinyl chloride and mixtures thereof.

3. A process as in claim 1 wherein the inert particles are microporous, microcrystalline, resilient cellulosic particles.

4. A process as in claim 1 wherein the elastomeric composition is deposited by exposing the coated, wetted substrate to vapors of the aqueous liquid.

5. A process as in claim 1 wherein the elastomeric composition is deposited by dipping the coated, wetted substrate in a bath of the aqueous liquid.

6. A process as in Claim 5 wherein the miscible solvent contains from about 50 to 80 parts by weight of said inert particles in which the average size is 20 to 70 microns.

References Cited

UNITED STATES PATENTS

| | | | |
|---|---|---|---|
| 2,826,509 | 3/1958 | Sarbach | 117—10 |
| 3,515,573 | 6/1970 | Japs et al. | 117—135.5 |
| 3,000,757 | 9/1961 | Johnston et al. | 117—63 |
| 3,524,791 | 8/1970 | Bethman et al. | 117—63 |
| 3,536,553 | 10/1970 | Farrell et al. | 117—135.5 |
| 3,505,096 | 4/1970 | Egitto et al. | 117—56 |
| 3,524,753 | 8/1970 | Sharp | 117—135.5 |
| 3,524,791 | 8/1970 | Bethman et al. | 117—63 |
| 3,384,506 | 5/1968 | Elkin | 117—63 |
| 3,555,129 | 1/1971 | Fukada et al. | 260—2.5 AY |

WILLIAM D. MARTIN, Primary Examiner

W. R. TRENOR, Assistant Examiner

U.S. Cl. X.R.

117—63, 135.5, 162